United States Patent [19]

Ostertag et al.

[11] Patent Number: 4,925,762

[45] Date of Patent: May 15, 1990

[54] CARRIER FOR REPROGRAPHY AND PRODUCTION OF THIS CARRIER

[75] Inventors: Werner Ostertag, Gruenstadt; Erwin Czech, Biblis; Franz-Ulrich Schmitt, Gerlingen; Detlef Schulze-Hagenest, Stuttgart, all of Fed. Rep. of Germany

[73] Assignee: BASF Aktiengesellschaft, Ludwigshafen, Fed. Rep. of Germany

[21] Appl. No.: 233,050

[22] Filed: Aug. 17, 1988

[30] Foreign Application Priority Data

Aug. 17, 1987 [DE] Fed. Rep. of Germany ....... 3727383

[51] Int. Cl.[5] ......................... G03G 9/14; B05D 7/00; B32B 15/02

[52] U.S. Cl. ................................ 430/106.6; 430/108; 430/137; 428/403; 427/216; 427/217

[58] Field of Search ..................... 430/108, 137, 106.6; 428/403; 427/252, 255.3, 216, 217

[56] References Cited

U.S. PATENT DOCUMENTS

| | | | |
|---|---|---|---|
| 3,306,768 | 2/1967 | Peterson | 427/255.3 |
| 3,798,167 | 3/1974 | Kulka et al. . | |
| 3,923,503 | 12/1975 | Hagenbach . | |
| 4,238,558 | 12/1980 | Ziolo | 428/403 |
| 4,245,026 | 1/1981 | Ziolo | 430/137 |
| 4,267,247 | 5/1981 | Ziolo et al. | 428/403 |
| 4,328,042 | 5/1982 | Ostertag et al. | 427/216 |
| 4,518,674 | 4/1985 | Watanabe et al. | 430/108 |
| 4,554,234 | 11/1985 | Imai et al. . | |

FOREIGN PATENT DOCUMENTS

| | | | |
|---|---|---|---|
| 1103079 | 5/1982 | Canada . | |
| 117572 | 9/1984 | European Pat. Off. . | |
| 142731 | 5/1985 | European Pat. Off. . | |
| 2262745 | 7/1973 | Fed. Rep. of Germany . | |
| 2402982 | 8/1974 | Fed. Rep. of Germany . | |
| 221014 | 3/1975 | Fed. Rep. of Germany . | |
| 2172121 | 9/1973 | France . | |
| 7342 | 4/1979 | Japan . | |
| 7343 | 7/1979 | Japan . | |
| 35736 | 10/1979 | Japan . | |
| 35735 | 11/1979 | Japan . | |
| 155363 | 5/1980 | Japan . | |
| 78553 | 7/1982 | Japan . | |
| 93355 | 9/1982 | Japan . | |
| 112758 | 10/1982 | Japan . | |
| 208754 | 3/1983 | Japan . | |
| 111163 | 1/1984 | Japan . | |
| 13243 | 2/1984 | Japan . | |
| 111160 | 2/1984 | Japan . | |
| 18955 | 3/1984 | Japan . | |
| 111162 | 3/1984 | Japan . | |
| 131942 | 3/1984 | Japan . | |
| 48774 | 4/1984 | Japan . | |
| 111161 | 4/1984 | Japan . | |
| 111158 | 7/1984 | Japan . | |
| 219757 | 7/1984 | Japan . | |
| 111159 | 8/1984 | Japan . | |
| 111927 | 9/1984 | Japan . | |
| 111926 | 11/1984 | Japan . | |
| 127057 | 11/1984 | Japan . | |
| 111157 | 12/1984 | Japan . | |
| 127058 | 12/1984 | Japan . | |
| 179749 | 3/1985 | Japan . | |
| 263955 | 4/1985 | Japan . | |
| 170863 | 7/1985 | Japan . | |
| 61-192749 | 8/1986 | Japan | 428/403 |
| 6661 | 12/1986 | Japan . | |
| 1421603 | 1/1976 | United Kingdom . | |
| 1571850 | 7/1980 | United Kingdom . | |

OTHER PUBLICATIONS

Controlled Release Technologies: Methods, Theory and Applications, vol. 2, pp. 133–154, H. S. Hall, and R. E. Pondell.

Plant/Operations Progress, vol. 4, No. 3, Jul. 1985, pp. 135–138, K. W. Olsen.

*Primary Examiner*—Paul R. Michl
*Assistant Examiner*—Jeffrey A. Lindeman
*Attorney, Agent, or Firm*—Oblon, Spivak, McClelland, Maier & Neustadt

[57] ABSTRACT

Carriers for a two-component dry developer are based on a ferrite or iron-containing core which carries a metal oxide layer consisting of reaction products deposited in the gas phase.

The carriers according to the invention have abrasion-resistant metal oxide layers which permit electrostatic charging in both directions. By adjusting the thickness of the metal oxide layer, the electrical conductivity can be altered.

20 Claims, No Drawings

CARRIER FOR REPROGRAPHY AND PRODUCTION OF THIS CARRIER

The developers in the case of two-component systems for the development of electrophotographically or electrostatically produced, latent images usually consist of carrier particles and toner particles. In electrophotography, an invisible, latent image is produced by selective exposure of a photoconductor covered with charge carriers. In order to render this charge image visible, it has to be developed. This is done by supplying toner powder, which essentially consists of a color-imparting component and a binder and has particle sizes of from 5 to 30 μm. The toner powder is transported to the photoconductor by means of the magnetic brush, carrier chains aligned along the field lines on a sectored magnet. The surface of the photoconductor must not be damaged by the brush sliding over it, during many copying cycles. The carrier particles are laden with toner and are conveyed uniformly to the photoconductor. This transport results in controlled electrostatic charging of the toner powder, which is then transferred to the photoconductor. The magnetic brush consisting of carrier particles strips excess toner from the photoconducting layer and conveys it back to the stock vessel. The developed toner image is then transferred to paper and fixed. The function of the development process in two-component systems is sufficiently well known and is described in detail in, for example, German Laid-Open Application DOS 2,402,982. In a typical case, the carrier particles consist of a core of magnetizable material. The material may consist of, for example, iron, nickel, magnetite, $Fe_2O_3$ or certain ferrites (Ni Zn ferrite, Mn Zn ferrite and barium ferrites). The carriers may be of irregular shape; in general, however, spherical particles having particle sizes of from 30 to 700 μm are used. To obtain the required electrical and mechanical properties, the carriers generally have a surface coating. Such shells generally consist of plastic to which an assistant, such as a metal oxide or an organometallic compound, is frequently added in order to increase the life of the coating.

The carriers must meet various requirements:

(i) They should have relatively low conductivity so that the charge applied by means of triboelectric forces does not flow away and the conductivity remains constant over a very large number of cycles;

(ii) there must be no electrical short-circuit between the photoconductor and the sectored magnet;

(iii) furthermore, the carriers should be magnetizable, ie. they should become aligned in the form of a brush under the influence of a sectored magnet;

(iv) the carriers must be readily flowing and have a shape such that the photoconductor is not damaged.

These requirements which have to be met by a carrier are generally fulfilled by the magnetic core materials only from the magnetic point of view, the electrical properties essentially being obtained via the coating. The following carrier types are known from the prior art:

(1) Widely used carriers are those which consist of a ferromagnetic iron or steel core and have a coating of fluorohydrocarbon polymers which generally contains inorganic pigment particles (U.S. Pat. No. 3,798,167, EP-A-142 731, U.S. Defensive Specification T 102 004H and Japanese Preliminary Published Applications 7 342/1979, 7 343/1979, 35 735/1979, 35 736/1979, 155 363/1980, 78 553/1982, 93 355/1982, 112 758/1982, 208 754/1983, 13 243/1984, 15 259 1984 and 219 757/1984).

Carriers of this type are produced by the following method: carrier cores fluidized in a fluidized bed are sprayed at elevated temperatures with a dispersion containing fluorohydrocarbon polymers and are then heated. The constancy of production is, however, difficult to guarantee since it is known that spray processes give layer thicknesses which are not very homogeneous. Investigations into such carriers show that the coatings on the particles differ very greatly in thickness and that the surface film is even incomplete in some cases, so that there is exposed uncoated surface. Like all plastic-coated carriers, the products prepared by this principle have the disadvantage of suffering from the exhaustion phenomenon. To date, there are no known polymers which do not exhibit this phenomenon. Furthermore, without the use of assistants in coating with plastics, the electrical conductivity cannot be varied. Another disadvantage is the material-specific position of polymers based on fluorohydrocarbons in the triboelectric potential series, which, without further additives, permits virtually only one form of charging, ie. positive charging, of the toner particles. Apart from the charging properties, selective adjustment of the electrical conductivity of polymers is scarcely possible without additives.

(2) Another group of carriers includes products which possess a metal-containing, ferromagnetic core and a passivating layer produced by surface oxidation and having lower conductivity (German Laid-Open Application DOS 2,289,317, U.S. Pat. Nos. 3,923,503 and 4,554,234, RD 221 014, Japanese Preliminary Published Application 087 601/1981, Canadian Patent 1,103,079, British Patent 1,571,850 and German Laid-Open Applications DOS 2,328,314 and DOS 2,262,745).

These products are produced by heating methods under certain conditions. The aim is to coat the metallic surface of the carrier in a controlled manner with an oxidation layer which is formed from the substrate. The disadvantages of these carriers are that defined layer thicknesses can scarcely be produced by burning the crude carrier in a limited supply of air. Furthermore, iron, in contrast to chromium and aluminum, does not form cohesive oxide layers but preferentially begins to rust at defects or impurities. In this method, it is particularly difficult to produce thick layers since increased oxidation readily leads to uncontrolled oxide effluorescence. An indirect disadvantage of the method is that even slight fluctuations in the composition of the carrier core have an undesirable effect on the conductivity and may thus adversely affect the constancy of the carriers obtained by this method.

(3) Recently, ferrite carriers have been disclosed which are based on the concept of combining the magnetic and electrical properties required for carriers, as well as low specific gravity, in a single material. Examples of such carriers are Ni Zn Fe spinels, Zn Mn Cu Fe spinels and doped barium ferrites.

As a rule, the dielectric properties of ferrite carriers cannot be adjusted with the required precision without subsequent surface coating or treatment. Such surface coatings or treatments may be, for example, coating with plastic or a specific surface oxidation of the ferrite particles (Japanese Preliminary Published Applications 18 955/1984; 48 774/1984, 111 157/1984, 111 158/1984, 111 159/1984, 111 160/1984, 111 161/1984, 111 162/1984, 111 163/1984, 111 926/1984, 111 927/1984, 111 929/1984, 127 057/1984, 127 058/1984, 131 942/1984, 170 863/1985, 179 749/1985, 263 749/1985, 263 955/1985 and 6 661/1986, EP-A-142 731 and 117 572).

Disadvantages of this carrier development are that the difficulties described under (1) and (2) are not eliminated by the aftertreatment. A specific disadvantage of ferrite carriers is their material-related abrasiveness which, particularly in the case of irregular external form, may cause damage to the photoconductor.

It is an object of the present invention to provide coated carriers which do not have the abovementioned disadvantages. It is the particular aim of the present invention to provide a coating technique which permits homogeneous coatings to be applied to iron or ferrite carriers in a reliable manner. In this method, the coatings should be binder-free, ie. free from plastic binders.

We have found that this object is achieved by coating the surface of metallic or ferrite carrier cores with metallic oxide films.

The present invention accordingly relates to carriers for a two-component dry developer which has a metal oxide layer on a ferrite core or a core containing metallic iron, wherein the metal oxide layer consists of reaction products deposited from the gas phase.

The carriers according to the invention have abrasion-resistant metal oxide layers which permit electrostatic charging in both directions. The metal oxide layers can be selectively adjusted in thickness, so that the electrical conductivity can be adjusted within certain limits, regardless of the composition of the core particles.

The present invention furthermore relates to a process for the production of the novel carriers. The process according to the invention is based on the fact that the particles are constantly moved with respect to one another during coating, with the result that the particles are homogeneously coated. In the process, volatile and metal compounds are reacted with oxygen and/or water in the presence of agitated core particles at elevated temperatures.

Using the process, it is possible to apply, for example, iron oxide, or titanium dioxide layers to core particles of iron and of ferrite material in a homogeneous manner. The oxide layers are formed by oxidation or hydrolysis of volatile metal compounds on the agitated core particles at elevated temperatures.

For coating core particles of iron or ferrites (iron and ferrite carrier cores) with iron oxide films, for example, the following procedure can be adopted: the carrier cores are brought to elevated temperatures, for example in a moving bed of carrier cores, and an iron pentacarbonyl-containing gas is then passed through this bed, oxygen or an oxygen-containing gas being added to the abovementioned gas. The iron carbonyl reacts with formation of an oxide layer on the carrier cores. For uniform coating, it is essential for the temperature of the carrier cores to be above 100° C. Advantageously, the carrier cores are heated to 200°–400° C., for example by means of wall heating. For uniform film formation, the concentration of the added iron pentacarbonyl vapor is critical. Experiments have shown that the concentration of iron pentacarbonyl vapor in the vehicle gas, and the oxygen concentration in the gas introduced for oxidation, must each be less than 5% by volume. At higher concentrations, particularly of iron carbonyl, films containing specks, ie. inhomogeneous films, are readily formed or the iron pentacarbonyl undergoes combustion with formation of soot-like iron oxide particles, without a film being deposited on the substrate. After film formation, the product is cooled and discharged and can be used without further aftertreatment.

The film thickness can readily and reliably be adjusted via the coating time. The film thickness can easily be checked from the formation of interference colors, at least in the case of thin layers on metallic iron carrier cores. The fact that interference colors are formed demonstrates, inter alia, the extremely homogeneous coating on the carriers according to the invention.

The iron oxide films allow both negative and positive electrostatic charging of toners. The conductivity of films on the carriers according to the invention is substantially lower than that of the metal and ferrite carriers and can be varied within certain limits by means of the coating thickness. The coating can furthermore be modified to obtain higher conductivities, if the oxygen concentrations in the oxidation of the iron carbonyl are adjusted so that the iron carbonyl cannot be completely oxidized to $Fe_2O_3$.

In the gas phase coating of the carrier cores, it is of course not essential to use the moving bed apparatus. Experiments have shown that the heated carrier cores can also be coated in other apparatuses, for example in a heated rotating tube or in a fluidized bed which is advantageously provided with a Wurster attachment (H. S. Hall, R. E. Pondell in Controlled Release Technol.: Methods, Theory, Application, Vol. 2, pages 133–154; Coating Place Inc., Verona, Wi, USA. K. W. Olsen, Recent Advances in Fluid Bed Agglomerating and Coating Technology; Plant Operation Progr. v4n3 July 1985, pages 135–138).

Durability tests on the carrier according to the invention show that the adhesion of the iron oxide films produced via the gas phase reaction is extremely high. This is also evident from measurements of the specific electrical conductivity as a function of pressure, where only slight changes in the conductivities as a function of pressure were found. The electrical conductivity can be adjusted to values of from 10 to $10^{-6}$ S.cm$^{-1}$ by coating with iron oxide. As the examples show, it is, however, also possible to produce more highly conductive coatings, the layer thickness, in particular, playing a critical role.

Furthermore, titanium dioxide layers can be prepared similarly to the layers of iron oxide, via a gas phase reaction. For coating the carrier cores of metal or ferrite, the following procedure is adopted in this case: a volatile titanium compound, preferably titanium tetrachloride vapor, is hydrolyzed in the presence of agitated carrier cores which have been brought to a relative high temperature. This is advantageously carried out in a moving bed in which the carrier cores can be heated, for example via wall heating. As in the case of the oxidation of iron carbonyl, care should be taken to ensure that the concentration of titanium tetrachloride vapor does not exceed 5% by volume, based on the total amount of other gases introduced into the moving bed. The remaining gases consist of the carrier gas for the titanium chloride vapor, usually nitrogen, and the carrier gas for the steam, which is required for hydrolysis. The carrier gases may be air or other gases which are inert under the conditions, eg. nitrogen. As in the case of coating with iron oxide, coating with titanium dioxide can also be carried out in other apparatuses, for example in a heatable rotating tube or in a fluidized bed.

The adhesion of the resulting titanium dioxide films is extremely high, so that, in the conductivity measurement, the resistivity scarcely changes as a function of pressure. The specific electrical conductivity of the carriers produced by the process can be brought to $10\text{–}10^{-10}$S.cm$^{-1}$. By varying the layer thickness of the titanium dioxide, it is also possible to obtain more highly conductive coatings. Another advantage of the novel process is that the titanium dioxide layers can be applied rapidly.

Using the process of the present invention, it is of course also possible to apply alternate iron oxide and titanium dioxide layers. Details of the nature of the films and of the coating process are given in the Examples.

A. The carriers obtained according to the Examples were investigated by the methods below.

AI. Specific electrical conductivity

This was determined as follows: In a highly insulated tableting press, a sample of the coated iron spheres (carrier) was compressed under 500 bar. The thickness d and the cross-section q of the tablet was determined using a micrometer screw. A test voltage U of 100 V was applied via gold contacts and the current I was measured. The specific electrical conductivity was calculated from the measured data using the following expression:

$$k = \frac{d \cdot J}{U \cdot q} \, [S \cdot \text{cm}^{-1}]$$

AII. Electrostatic charge capacity (q/m value)

The electrostatic charge capacity was determined using a commercial toner for a commmercial IBM 3800 laser printer. The carrier particles were mixed with a toner in a weight ratio of 99:1 and shaken in a glass vessel for 1 minute. Thereafter, a weighed amount of this mixture was introduced into a hard-blow-off cell which was coupled to an electrometer (q/m meter from PES Laboratorium, Dr. R. Epping, Neufahrn). The mesh size of the sieves used in the hard-blow-off cell was 50 μm and was chosen so that no carrier was discharged but the toner powder could be completely blown off. After blow-off and extraction of the toner were complete, it was possible to determine the charge and relate it to the toner weight by reweighing the toner.

AIII. Colorimetric values

To measure these values, samples of the coated iron spheres were converted into coating pastes, the content of iron spheres being 10% by weight. The colorimetric evaluation of the resulting colors was carried out according to the CIELAB method of measure ment (DIN 6174) on a HunterLab measuring instrument.

AIV. Life of the carrier

To determine the life of the carrier, 500 g of the coated spheres were mixed with 5 g of a commercial toner (IBM 3800) and introduced into the developing unit of a life tester (LD-Meter from Dr. R. Epping, Neufahrn). A further 30 kg of the toner, which can be fed into the developer space via a screw conveyor as a function of the toner concentration, were kept ready in a stock vessel next to the developer unit. The toner concentration was determined via the potential measurements and was kept constant by controlling the feed. By applying a potential of −500 V between the photoconductor and the developer unit, toner was constantly consumed and was extracted at the other side of the photoconductor. The photoconductor drum had a diameter of 240 mm and was rotated at a speed of 400 mm/sec, ie. one revolution of the photoconductor drum corresponds to about 2 DIN A4 copies (about 60 copies/minute). The developer brush was simultaneously moved at a speed of about 3 revolutions per second. The life of the carrier was determined by means of electrostatic charge capacity measurements on samples taken at regular intervals from the LD-Meter. The q/m values measured during the life test could be plotted graphically against the number of copies.

In the present specification, mean values of the q/m values measured at the beginning and after every 3,000 copies up to $1.10^5$ copies were calculated.

B. EXAMPLES

EXAMPLE 1

2,000 g of iron powder having particle sizes of from 63 to 180 μm and a surface area of $2.3\times10^{-3}$ m$^2$.g$^{-1}$ (Toniolo Type TC 100) are introduced into a quartz flask having a diameter of 10 cm, and the flask is attached to a rotary evaporator. Through the motor shaft, two water-cooled inlet tubes and a thermocouple are introduced into the center of the quartz flask through a gas-tight seal so that the openings of the tubes are completely covered by iron spheres. The iron particles are heated to 240° C. at a flask speed of 50 rpm under a stream of 60 l/h of nitrogen. Instead of nitrogen, 50 l/h of air is then passed in through one inlet tube. An evaporation vessel which is calibrated and heated at 25° C. and has a volume of 250 ml, and through which 10 l/h of nitrogen are passed, is connected upstream of the second inlet tube. 2 ml of iron pentacarbonyl are injected into this vessel through a rubber seal. The nitrogen becomes laden with iron pentacarbonyl vapor and is introduced into the moving bed. Both inlet tubes are cooled to 25° C. This ensures that decomposition and oxidation take place only in the reaction space.

After all the iron pendacarbonyl has been vaporized, the coated iron spheres are allowed to cool to room temperature under a stream of 60 l/h of nitrogen. The spheres are found to have a golden brown coloration and a metallic gloss. The specific electrical conductivity, the electrostatic charge capacity, the colorimetric values and the life of the resulting carrier are determined according to (A).

The results of the measurements are summarized in Table 1, together with the results for the carriers obtained according to Examples 2 to 8.

EXAMPLES 2 TO 8

2,000 g of the iron powder stated in Example 1 are introduced into the apparatus described in Example 1 and are coated with iron oxide with the aid of iron pentacarbonyl as described in Example 1. The amount of iron pentacarbonyl used for coating and the properties of the resulting carriers are shown in Table 1. The properties of the products are determined according to A.

TABLE 1

| Example | $Fe(CO)_5$ ml | Conductivity (1) [$S.cm^{-1}$] | q/m (2) [$\mu C.g^{-1}$] | Life q/m (3) [$\mu C.g^{-1}$] | Color Visual | CIELAB L | C | H* |
|---|---|---|---|---|---|---|---|---|
| 1 | 2 | 8.3 | 10.5 | 10.4 | brown | 30.6 | 8.8 | 76.4 |
| 2 | 4 | 4.8 | 10.9 | 11.2 | reddish blue | 20.9 | 5.5 | 331.6 |
| 3 | 6 | 1.2 | 15.5 | 15.8 | blue | 26.9 | 10.3 | 259.7 |
| 4 | 8 | $6.8 \times 10^{-2}$ | 17.1 | 17.6 | bluish green | 36.4 | 5.5 | 222.4 |
| 5 | 10 | $3.5 \times 10^{-4}$ | 19.0 | 19.5 | brown | 40.9 | 8.7 | 61.1 |
| 6 | 12 | $3.6 \times 10^{-5}$ | 18.9 | 19.9 | reddish blue | 34.4 | 5.8 | 326.0 |
| 7 | 14 | $8.2 \times 10^{-6}$ | 20.7 | 20.0 | blue | 34.1 | 4.2 | 250.2 |
| 8 | 16 | $7.6 \times 10^{-6}$ | 20.4 | 20.3 | bluish green | 34.2 | 4.1 | 231.5 |

(1) Specific electrical conductivity determined according to AI.)
(2) Electrical charge capacity determined according to AII.) using IBM 3800 toner
(3) Life of the carrier determined according to AIV.) using IBM 3800 toner; mean value

EXAMPLE 9

2,500 g of an iron powder having particle sizes of from 125 to 425 $\mu$m and a mean surface area of $1.4 \times 10^{-3} m^2.g^{-1}$ (Toniolo Type 40753) are introduced into the apparatus described in Example 1 and heated to 250° C. while nitrogen is passed in. The gases are passed in as described in Example 1 via two inlet tubes thermostated at 25° C. with water. Thereafter, 20 l/h of nitrogen are passed into the reactor through the first inlet tube. The nitrogen stream is passed beforehand through an evaporation vessel containing 10 ml of titanium tetrachloride and becomes saturated with titanium tetrachloride. A stream of 30 l/h of nitrogen saturated with water is fed into the reactor space through the second inlet tube. In this way, the 20 ml of titanium tetrachloride are vaporized in the course of 6 hours. The product is then cooled to room temperature under nitrogen. The electrical conductivity, the electrostatic charge capacity and the life of the resulting carrier are determined according to (AI), (AII) and (AIV).

Specific electrical conductivity: $8.3 \times 10^{-10} S.cm^{-1}$, electrostatic charge capacity (q/m value): 4.9 $\mu C.g^{-1}$ (using IBM 3800 toner), life of the carrier: 4.8 $\mu C.g^{-1}$.

EXAMPLE 10

750 g of a ferrite carrier (Hitachi, KBN 100, Type E) having particle sizes of from 100 to 200 $\mu$m and a mean surface area of $7.8 \times 10^{-2} m^2.g^{-1}$ are introduced into the apparatus described in Example 1 and heated to 250° C. while nitrogen is passed in. The gas is introduced via two water-cooled inlet tubes, as described in Example 1. Thereafter, the feeds are changed to carrier gas and air, as in Example 1, and 15 ml of iron pentacarbonyl are injected into the evaporation vessel. After the iron pentacarbonyl is vaporized, the carrier is cooled under an inert gas.

The specific electrical conductivity, the electrostatic charge capacity, the saturation magnetization and the coercive force of the starting material and of the carrier are summarized in Table 2.

EXAMPLE 11

2,500 g of the ferrite carrier stated in Example 10 are introduced into the apparatus described in Example 1 and heated to 250° C. while nitrogen is passed in. The feed is changed from the gas to the carrier gas as described in Example 1, but no oxygen is passed into the apparatus. 15 ml of iron pentacarbonyl are injected into the evaporation vessel. When evaporation is complete, the spheres are cooled under an inert gas. The spheres are found to be coated with an iron film. The specific electrical conductivity, the electrostatic charge capacity, the saturation magnetization and the coercive force of the starting material and of the coated material are summarized in Table 2.

EXAMPLE 12

4.5 kg of iron powder (Toniolo Type 40753) are introduced into a vertical, heatable tube having a diameter of 40 mm and a length of 600 mm and are heated to 220° C. The small iron spheres are circulated at a rate of about 9 kg per hour with the aid of a discharge screw and a stream of nitrogen. 20 ml of titanium tetrachloride are passed into the hot moving bed at a height of 500 mm in the course of 5 hours via a nozzle, by means of a stream of 50 l/h of nitrogen. Steam for hydrolysis is fed in via a second nozzle at the same height, by means of a stream of 10 l/h of nitrogen. At the same time, in the course of the 5-hour reaction time, 10 ml of iron pentacarbonyl are introduced uniformly at a height of 200 mm by means of a stream of 50 l/h of nitrogen, and 10 l/h of air are fed in through a further nozzle at the same height. In this way, the spheres are coated alternately with $TiO_2$ and $Fe_2O_3$. The electrostatic charge capacity and the other results of the measurements are summarized in Table 2.

TABLE 2

| Example | Spec. electrical conductivity [$S.cm^{-1}$] | q/m [$\mu C/g$] | Saturation magnetization [$nTm^3.g^{-1}$] | Coercive force [$kAm^{-1}$] |
|---|---|---|---|---|
| 10 | $5.2 \times 10^{-8}$ | 15.8 | 59 | <0.4 |
| 11 | $6.9 \times 10^{-1}$ | 12.45 | 59 | <0.4 |
| 12 | $2.3 \times 10^{-9}$ | 5.3 | 59 | <0.4 |
| Starting material (comparison) | $1.2 \times 10^{-7}$ | 8.1 | 59 | <0.4 |

We claim:

1. A carrier for a two-component dry developer, wherein the said carrier has, on particles of a ferrite core or a metallic iron core, a homogeneous metal oxide layer formed by a gas phase reaction of a volatile metal compound with oxygen or water or with oxygen and water in the presence of agitated core particles at elevated temperatures.

2. A carrier as claimed in claim 1, wherein the metal oxide layer consists of iron oxide produced by oxidation of iron carbonyl.

3. A carrier as claimed in claim 1, wherein the metal oxide layer consists of iron oxide produced by oxidation of iron pentacarbonyl.

4. A carrier as claimed in claim 1, wherein the metal oxide layer consists of titanium dioxide produced by hydrolytic decomposition of titanium tetrachloride in the gas phase.

5. A carrier as claimed in claim 1, which has a specific electrical conductivity of from 10 to $10^{-11}$S.cm$^{-1}$.

6. A carrier as claimed in claim 2, which has a specific electrical conductivity of from 10 to $10^{-11}$S.cm$^{-1}$.

7. A carrier as claimed in claim 3, which has a specific electrical conductivity of from 10 to $10^{-11}$S.cm$^{-1}$.

8. A carrier as claimed in claim 4, which has a specific electrical conductivity of from 10 to $10^{-11}$S.cm$^{-1}$.

9. A process for the preparation of a carrier for a two-component dry developer, which carrier has a metal oxide coating on a ferrite or metallic iron core, wherein a volatile metal compound is reacted with oxygen or water or with oxygen and water in the presence of agitated core particles at elevated temperatures.

10. A process as claimed in claim 9, wherein the volatile metal compound and its reactants, oxygen or water or oxygen and water, are introduced with the aid of carrier gases.

11. A process as claimed in claim 9, wherein the volatile metal compound used is an iron carbonyl.

12. A process as claimed in claim 11, wherein iron pentacarbonyl is used.

13. A process as claimed in claim 9, wherein the volatile metal compound used in titanium tetrachloride.

14. A process as claimed in claim 10, wherein the volatile metal compound used is titanium tetrachloride.

15. A process as claimed in claim 9, wherein the core particles are fluidized in a fluidized bed.

16. A process as claimed in claim 12, wherein the core particles are fluidized in a fluidized bed.

17. A process as claimed in claim 13, wherein the core particles are fluidized in a fluidized bed.

18. A process as claimed in claim 9, wherein the core particles are agitated in a fixed bed.

19. A process as claimed in claim 12, wherein the concentration of the volatile metal compound does not exceed 5% by volume, based on the total amount of other gases introduced per unit time.

20. A process as claimed in claim 13, wherein the concentration of the volatile metal compound does not exceed 5% by volume, based on the total amount of other gases introduced per unit time.

* * * * *